(12) United States Patent
Peng et al.

(10) Patent No.: US 9,448,600 B2
(45) Date of Patent: Sep. 20, 2016

(54) SUPPORTING DEVICE AND MOUNTING APPARATUS FOR DATA STORAGE DEVICE AND ELECTRONIC DEVICE HAVING THE SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Wen-Tang Peng, New Taipei (TW); Jie Yang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/753,781

(22) Filed: Jun. 29, 2015

(65) Prior Publication Data

US 2016/0161997 A1  Jun. 9, 2016

(30) Foreign Application Priority Data

Dec. 9, 2014  (CN) .......................... 2014 1 0744924

(51) Int. Cl.
*G06F 1/18* (2006.01)
*G11B 33/12* (2006.01)

(52) U.S. Cl.
CPC ............... *G06F 1/187* (2013.01); *G06F 1/181* (2013.01); *G11B 33/128* (2013.01)

(58) Field of Classification Search
CPC .............................. G06F 1/187; G11B 33/128
USPC .................................................... 361/679.33
See application file for complete search history.

(56) References Cited

U.S. PATENT DOCUMENTS

| 6,853,548 | B2* | 2/2005 | Vanderheyden | H05K 7/1487 361/679.02 |
|---|---|---|---|---|
| 6,918,174 | B2* | 7/2005 | Kim | G06F 1/184 248/682 |
| 7,126,817 | B2* | 10/2006 | Li | G06F 1/184 312/223.2 |
| 7,515,410 | B1* | 4/2009 | Dingfelder | G06F 1/187 361/679.33 |
| 7,903,401 | B2* | 3/2011 | Lee | G06F 1/187 361/679.33 |
| 7,983,032 | B2* | 7/2011 | Walker | G06F 1/187 312/223.2 |
| 2004/0023522 | A1* | 2/2004 | Chang | H01R 29/00 439/43 |
| 2007/0247805 | A1* | 10/2007 | Fujie | G11B 33/12 361/679.49 |
| 2009/0002934 | A1* | 1/2009 | Carlson | G06F 1/187 361/679.33 |

(Continued)

*Primary Examiner* — Adrian S Wilson
(74) *Attorney, Agent, or Firm* — Zhigang Ma

(57) ABSTRACT

An electronic device includes a chassis having two side walls, two data storage devices, two supporting devices, and a bezel. Each side wall defines a lock hole. Each supporting device includes a bracket, a pair of lock pieces, and a pair of connecting members. The bracket includes two opposite side plates each defining a lock opening.

Each lock piece includes two clasp members. Each connecting member includes two second poles. The first clasp members extend through the lock openings and insert into the lock holes. The second clasp members of the front supporting device are detachably coupled to the bezel, and the second clasp members of the rear the supporting devices are detachably coupled to the front supporting device. The second poles of the front supporting device are coupled to the bezel, and the second poles of the rear supporting device are coupled to the front supporting device.

20 Claims, 8 Drawing Sheets

(56) References Cited

U.S. PATENT DOCUMENTS

| | | | |
|---|---|---|---|
| 2009/0009955 A1* | 1/2009 | Motoe | G06F 1/187 361/679.33 |
| 2009/0167124 A1* | 7/2009 | Lee | G06F 1/187 312/223.2 |
| 2011/0141680 A1* | 6/2011 | Yang | G06F 1/187 361/679.31 |
| 2011/0267761 A1* | 11/2011 | Peng | G11B 33/128 361/679.31 |
| 2012/0212898 A1* | 8/2012 | Lo | G11B 33/124 361/679.33 |
| 2015/0016050 A1* | 1/2015 | Chen | G06F 1/187 361/679.33 |

* cited by examiner

SUPPORTING DEVICE AND MOUNTING APPARATUS FOR DATA STORAGE DEVICE AND ELECTRONIC DEVICE HAVING THE SAME

FIELD

The subject matter herein generally relates to a supporting device and a mounting apparatus for a data storage device, and an electronic device having the same.

BACKGROUND

A data storage device is usually mounted in a mounting bracket via a number of screws. The mounting bracket is mounted in a chassis of an electronic device. The mounting bracket can be fixedly installed in the chassis.

BRIEF DESCRIPTION OF THE DRAWINGS

Implementations of the present technology will now be described, by way of example only, with reference to the attached figures.

DETAILED DESCRIPTION

Figure 1:
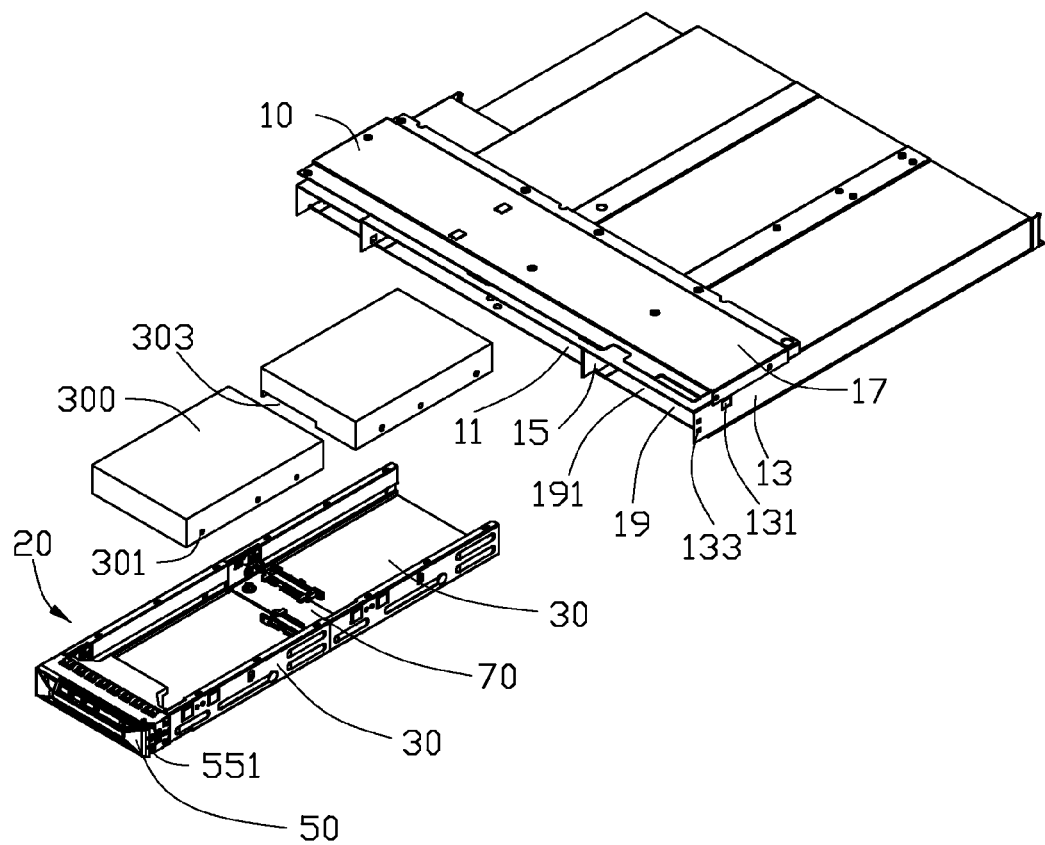
FIG. 1 is an exploded, isometric view of an exemplary embodiment of an electronic device comprising a chassis, a mounting apparatus and two data storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure relates to a supporting device and a mounting apparatus for a data storage device, and an electronic device having the same.

FIG. 1 illustrates an exemplary embodiment of an electronic device. The electronic device comprises a chassis 10, a mounting apparatus 20, and two data storage devices 300. A row of posts 301 protrude out from each opposite side of each data storage device 300. Each data storage device 300 comprises a connector 303 located at a front end of the data storage device 300.

The chassis 10 comprises a bottom wall 11, two opposite side walls 13, 15 perpendicular to the bottom wall 11, and a top wall 17 coupled to tops of the side walls 13, 15. The bottom wall 11, the opposite side walls 13, 15 and the top wall 17 cooperatively define a receiving space 19 to receive the mounting apparatus 20. A front end of the chassis 10 defines an opening 191. The mounting apparatus 20 can slide in and out of the receiving space 19 through the opening 191. Front ends of the side walls 13, 15 each define a lock hole 131. The side wall 13 defines two mounting holes 133 arranged perpendicular to the bottom wall 11 and located at front of the lock hole 131.

Figure 2:
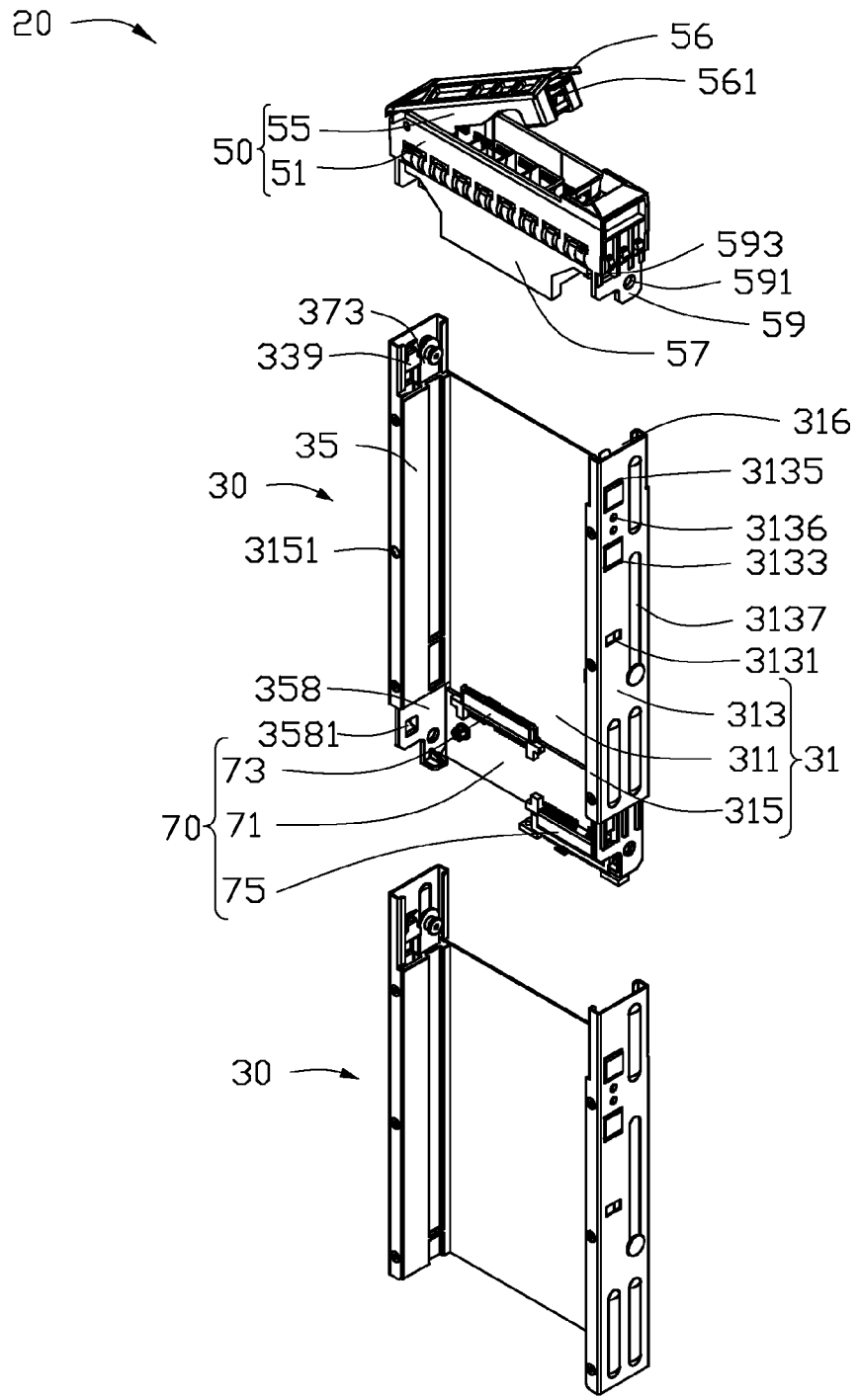
FIG. 2 is an exploded, isometric view of the mounting apparatus of the electronic device of FIG. 1, wherein the mounting apparatus includes two supporting devices.
Figure 5:
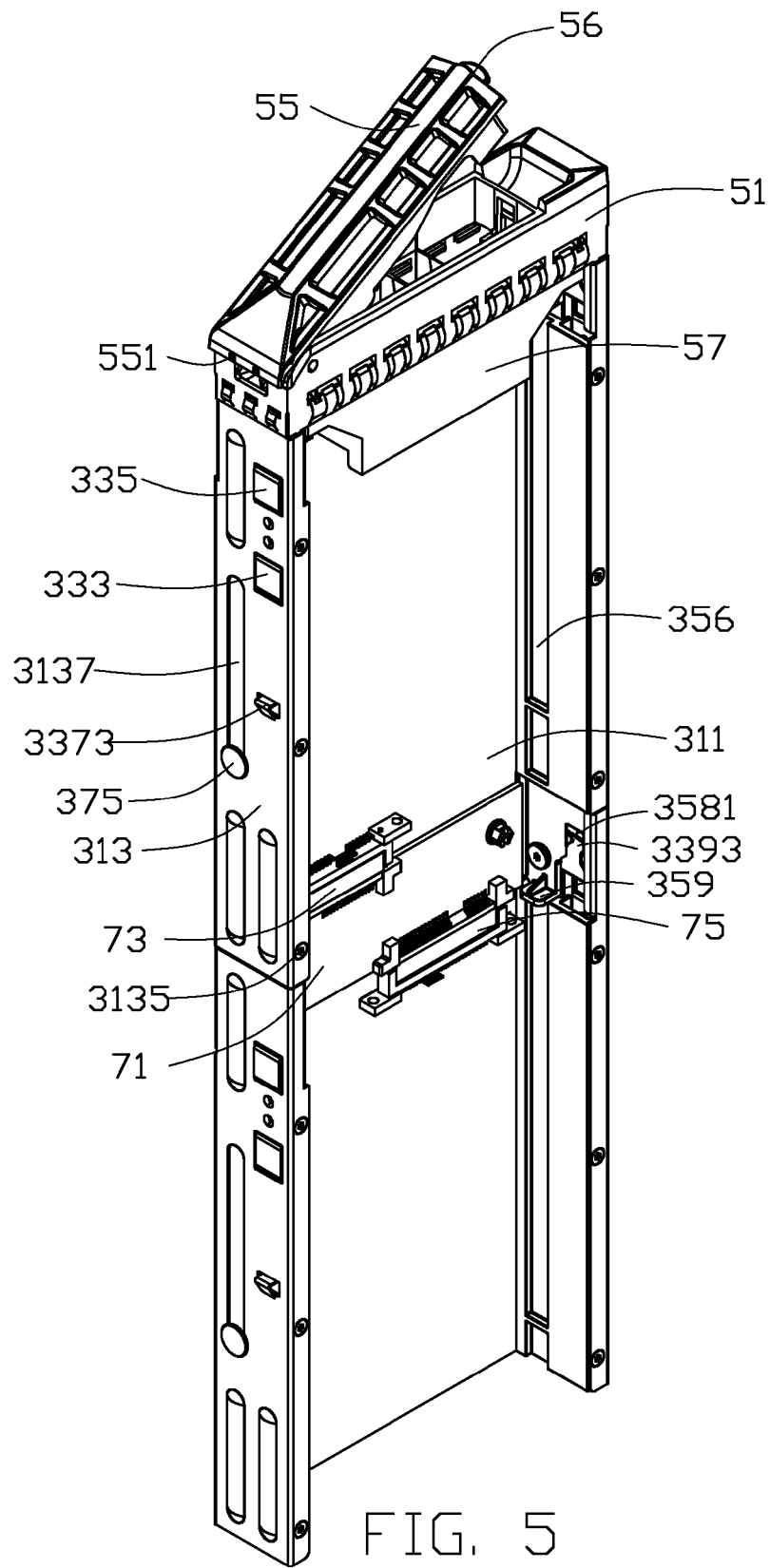
FIG. 5 is an assembled, isometric view of FIG. 2.

FIG. 2 illustrates the mounting apparatus 20 of the electronic device. The mounting apparatus 20 comprises a bezel 50, two supporting devices 30, and a connecting plate 70. The bezel 50 comprises a cover 51 and an operating portion 55 rotatably coupled to a front side of the cover 51 through a pivot. A stop portion 57 protrudes rearward from a middle portion of a rear side of the cover 51. Two lock plates 59 respectively extend from two opposite ends of the cover 51. A lower portion of a rear end of each lock plate 59 defines a pivot hole 591. An upper portion of a front end of each lock plate 59 defines a lock opening 593. A resilient latching member 56 is coupled to one end of the operating portion 55 away from the pivot. A latch 561 protrudes out from the latching member 56, to engage in the cover 51. Two protrusions 551 (as shown in FIGS. 1 and 5) protrude out from an opposite end of the operating portion 55 adjacent to the pivot.

Figure 3:
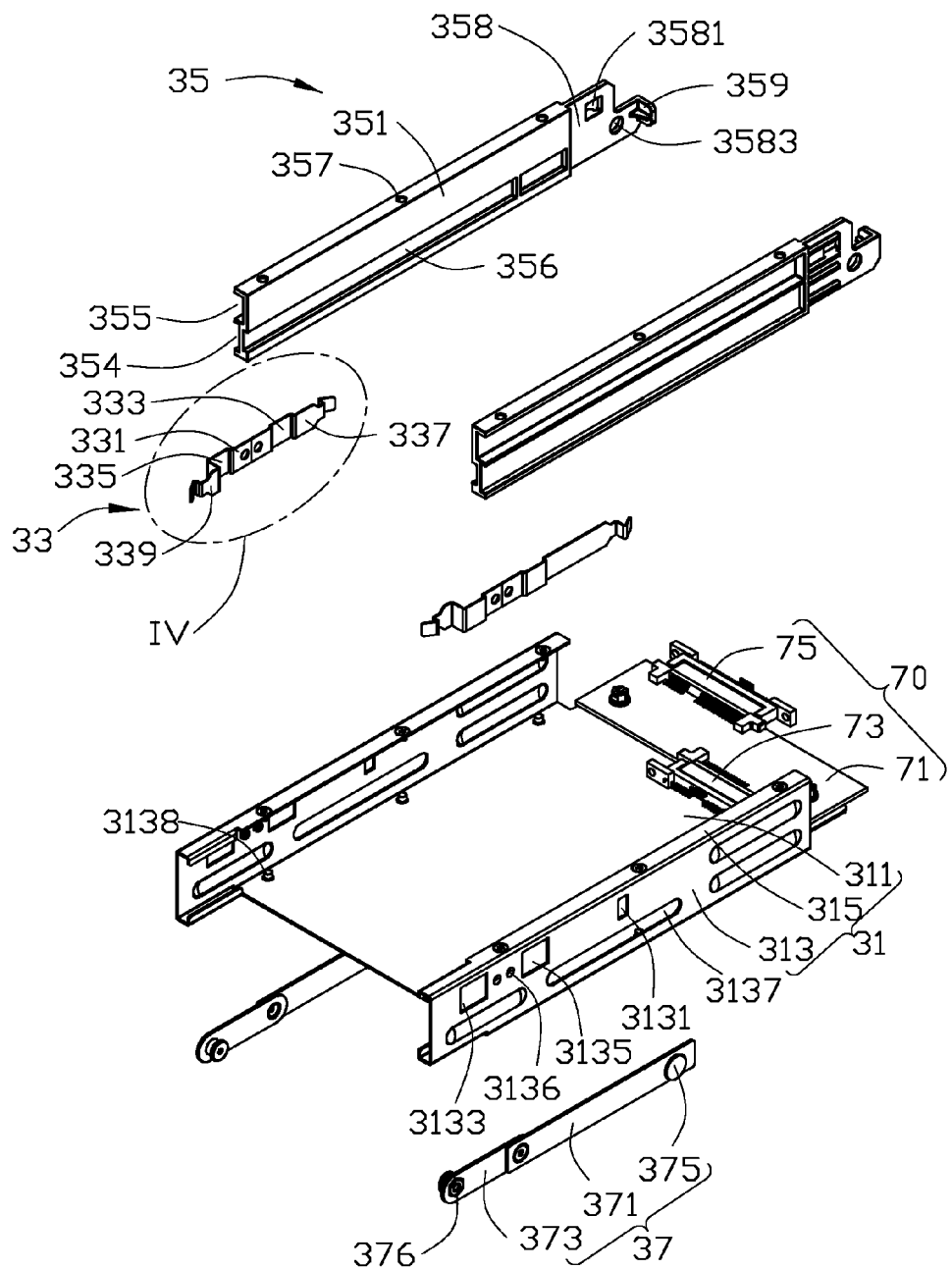
FIG. 3 is an exploded, isometric view of one of the supporting devices of FIG. 2 from another angle, wherein the supporting device includes two lock pieces.

FIG. 3 illustrates one of the supporting devices 30 of the electronic device. Each supporting device 30 comprises a bracket 31, two resilient lock pieces 33, two positioning members 35, and two connecting members 37.

The bracket 31 comprises a substantially rectangular bottom plate 311, two opposite side plates 313 extending up from two opposite sides of the bottom plate 311, and two end plates 315 extending inward from top ends of the side plates 313. The bottom plate 311, each side plate 313 and the corresponding end plate 315 cooperatively define a slot 316. A middle portion of an upper side of each side plate 313 defines a lock opening 3131. An upper portion of a front end of each side plate 313 defines two spaced lock slots 3133, 3135. Each side plate 313 defines two mounting holes 3136 between the two lock slots 3133, 3135. A middle portion of a lower end of each side plate 313 defines a slide slot 3137 along a lengthwise direction of the side plate 313. Each end plate 315 defines a plurality of through holes 3151 spaced in a lengthwise direction of the end plate 315. The bottom plate 311 defines a plurality of through holes 3138 adjacent to each side wall 313.

Figure 4:
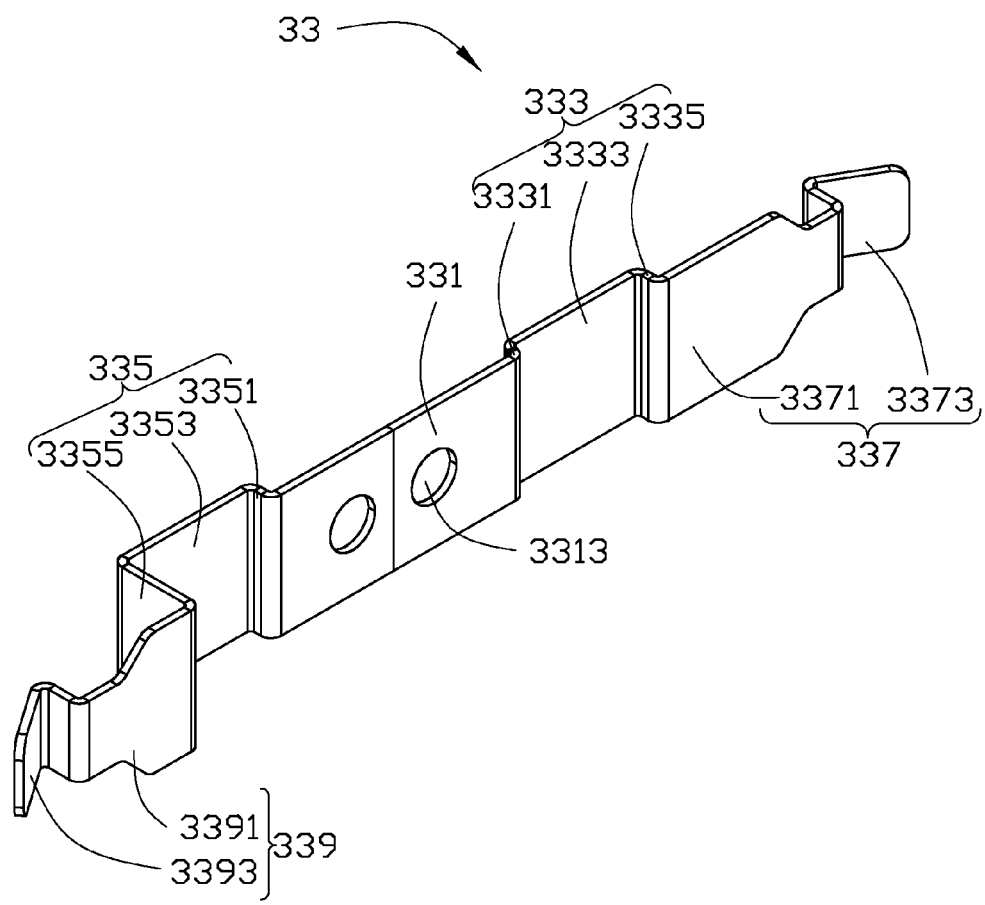
FIG. 4 is an enlarged view of one of the lock pieces of FIG. 3.

FIG. 4 illustrates one of the lock pieces 33. Each lock piece 33 comprises a substantially U-shaped first pressing portion 333, a substantially U-shaped second pressing portion 335, a substantially rectangular mounting piece 331 coupled between the first pressing portion 333 and the second pressing portion 335, a first clasp member 337 extending from an extremity of the first pressing portion 333, and a second clasp member 339 extending from an extremity of the second pressing portion 335. A middle portion of the mounting piece 331 defines two through holes 3313. The first pressing portion 333 comprises a connecting piece 3331 vertically extending out from one end of the mounting piece 331, a pressing piece 3333 vertically extending from an extremity of the connecting piece 3331 away from the mounting piece 331, and a connecting piece 3335 vertically extending in from an extremity of the pressing piece 3333. The second pressing portion 335 comprises a connecting piece 3351 vertically extending out from an opposite end of the mounting piece 331, a pressing piece 3353 vertically extending from an extremity of the connecting piece 3351 away from the mounting piece 331, and a connecting piece 3355 vertically extending in from an extremity of the pressing piece 3353. The first clasp member 337 comprises an extending piece 3371 vertically extending from an extremity of the connecting piece 3335 away from the first pressing portion 333, and a substantially V-shaped hook 3373 extending out from an extremity of the extending piece 3371. The second clasp member 339 comprises an extending piece 3391 vertically extending from an extremity of the connecting piece 3355 away from the first pressing portion 335, and a substantially V-shaped hook 3393 extending out from an extremity of the extending piece 3391. Openings of the hooks 3373 and 3393 face an inner side of the lock pieces 33.

Each positioning member 35 comprises a substantially rectangular positioning plate 351. A lower portion of a first side of the positioning plate 351 defines a groove 354 along a lengthwise direction of the positioning plate 351. An upper portion of the first side of the positioning plate 351 defines a groove 355 along the lengthwise direction of the positioning plate 351. A lower portion of a second side of the positioning plate 351 defines a positioning groove 356 along the lengthwise direction of the positioning plate 351. A top portion and a bottom portion of the positioning plate 351 respectively define a plurality of positioning holes 357. The positioning members 35 of one of the supporting devices 30 comprise a lock plate 358 protruding from a rear end of each of the corresponding positioning plates 351, and a stop plate 359 vertically extending in from a rear end of the lock plate 358. An upper portion of the rear end of the lock plate 358 defines a lock opening 3581. A lower portion of the rear end of the lock plate 358 defines a pivot hole 3583.

Each connecting member 37 comprises a first pole 371, a second pole 373 rotatably coupled to a front end of the first pole 371, and a fastener, such as a rivet 375. The rivet 375 is configured to be mounted to a rear end of the first pole 371. A front end of the second pole 373 defines a pivot hole 376.

The connecting plate 70 comprises a circuit board 71 mounted to a rear end of the bottom plate 311 of one of the supporting devices 30 with the lock plates 358 and the stop plates 359, a first connector 73 located at a front end of the circuit board 71, and a second connector 75 located at a rear end of the circuit board 71. The circuit board 71 is electrically coupled to a motherboard of the electronic device. In at least one embodiment, the circuit board 71 is mounted to the bottom plate 311 through two screws.

In assembly of each supporting device 30, the lock pieces 33 are respectively received in the slots 316, the hook 3373 of each lock piece 33 passes through the lock opening 3131 of the corresponding side plate 313, and the first pressing portion 333 and the second pressing portion 335 of each lock piece 33 respectively pass through the lock slots 3133 and 3135 of the corresponding side plate 313. The through holes 3313 of each lock piece 33 align with the mounting holes 3136 of the corresponding side plate 313, and two screws pass through the through holes 3313 of the lock piece 33 to fasten into the mounting holes 3136 of the corresponding side plate 313, to attach the lock piece 33 to the corresponding side plate 313. The connecting members 37 are respectively received in the slots 316. The second poles 373 of the connecting member 37 are located at front ends of the slots 316. Two rivets 375 respectively pass through the slide slots 3137 from outside of the side plates 313 and fasten into rear ends of the corresponding first poles 371. The connecting members 37 are slidably attached to the corresponding side plates 313 along the slide slots 3137. The positioning members 35 with the stop plates 359 located at a rear end of the bracket 31 and facing an inside of the bracket 31, respectively, slide into the slots 316. A plurality of screws pass through the through holes 3151 of the end plates 315 and fasten into the positioning holes 357 of the top portions of the positioning members 35. A plurality of screws pass through the through holes 3138 of the bottom plate 311 and fasten into the positioning holes 357 of the bottom portions of the positioning members 35. The positioning members 35 are mounted to the bracket 31. The first sides of the positioning members 35 face the side plates 313 of the bracket 31. The connecting members 37 are respectively received in the grooves 354 of the positioning members 35. The lock pieces 33 are respectively received in the grooves 355 of the positioning members 35, and the lock plates 358 of the positioning members 35 are exposed out of rear edges of the side plates 313.

FIGS. 1, 2, and 5 illustrate an assembly of the mounting apparatus 20. The bezel 50 is located in front of one of the supporting devices 30 with the connecting plate 70, and the lock plates 59 of the bezel 50 respectively located inside of the two second poles 373 and outside of the two lock pieces 33 of the supporting device 30. The pivot holes 376 are configured to align with the corresponding pivot holes 591. Two fasteners, such as rivets respectively pass through the two pivot holes 591 and fasten to the pivot holes 376. Thus, the bezel 50 is rotatably coupled to the two connecting members 37. The other supporting device 30 is located behind the front supporting device 30 with the connecting plate 70. The lock plates 358 of the front supporting device 30 are respectively located inside of the two second poles 373 and outside of the two lock pieces 33 of the rear supporting device 30, with the pivot holes 3583 of the front supporting device 30 aligning with the corresponding pivot holes 376 of the rear supporting device 30. Two fasteners, such as rivets respectively pass through the two pivot holes 3583 and fasten to the pivot holes 376. Thus, the two supporting devices 30 are rotatably coupled.

In assembly of the data storage devices 300, the two supporting devices 30 are pulled away from each other. The connecting members 37 of the rear supporting device 30 slide out along the corresponding slide slots 3137 until the rivets 375 of the connecting members 37 are stopped by front ends of the corresponding slide slots 3137. The front supporting device 30 together with the second poles 373 of the rear supporting device 30 are rotated down to be perpendicular to the rear supporting device 30. A rear end of one of the data storage devices 300 is slid into the rear supporting device 30 from a front end of the rear supporting device 30. The posts 301 of the data storage device 300 are slid into the corresponding positioning grooves 356 until two of the posts 301 adjacent to the rear end of the data storage device 300 are stopped by rear ends of the corresponding positioning grooves 356. Then, the front supporting device 30 together with the second poles 373 of the rear supporting device 30 are rotated up to be parallel to the rear supporting device 30, and the two supporting devices 30 are pushed towards each other. The connecting members 37 of the rear supporting device 30 are slid back along the corresponding slide slots 3137. When the hooks 3393 of the rear supporting device 30 are inserted into the corresponding lock openings 3581 of the front supporting device 30, the second connector 75 of the circuit board 71 is electrically coupled to the connector 303 of data storage device 300 in the rear supporting device 30, and a front end of the data storage device 300 in the rear supporting device 30 engages with the stop plates 359 of the front supporting device 30.

The bezel 50 is pulled forward, and the connecting members 37 of the front supporting device 30 are slid out along the corresponding slide slots 3137 until the rivets 375 of the connecting members 37 are stopped by front ends of the corresponding slide slots 3137. The bezel 50 together with the second poles 373 of the front supporting device 30 is rotated down to be perpendicular to the front supporting device 30. A front end of the other data storage device 300 is slid into the front supporting device 30 from a front end of the front supporting device 30. The posts 301 of the other data storage device 300 are slid into the corresponding positioning grooves 356 until two of the posts 301 adjacent to the front end of the other data storage device 300 are stopped by rear ends of the corresponding positioning grooves 356. The connector 303 of the other data storage device 300 is electrically coupled to the first connector 73 of the circuit board 71. Then, the bezel 50 together with the second poles 373 of the front supporting device 30 are rotated up to be parallel to the front supporting device 30, and the bezel 50 is moved towards the front supporting device 30. The connecting members 37 of the front supporting device 30 are slid back along the corresponding slide slots 3137. When the hooks 3393 of the front supporting device 30 are inserted into the corresponding lock openings 593 of the bezel 50, the stop portion 57 of the bezel 50 engages with a rear end of the other data storage device 300. Thus, the data storage devices 300 are fixed to the mounting apparatus 20.

Figure 6:
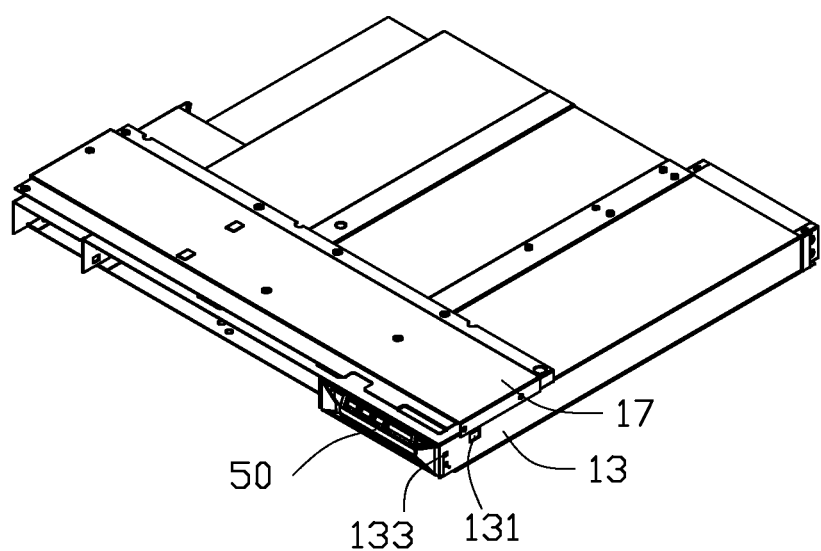
FIG. 6 is an assembled, isometric view of FIG. 1.

FIG. 6 illustrates the mounting apparatus 20 and the data storage devices 300 are inserted into the receiving space 19 through the opening 191. The operating portion 55 is rotated away from the cover 51. The hooks 3373 of the lock pieces 33 of the two supporting devices 30 slidably resist against the side walls 13 and 15 and deform the lock pieces 33. When the mounting apparatus 20 is completely received in the receiving space 19, the operating portion 55 is rotated to lock the latch 561 of the latching member 56 to the cover 51. The protrusions 551 of the operating portion 55 engage in the mounting holes 133 of the side wall 13. Thus, the mounting apparatus 20 is assembled in the chassis 10, and the electronic device is assembled.

Figure 7:
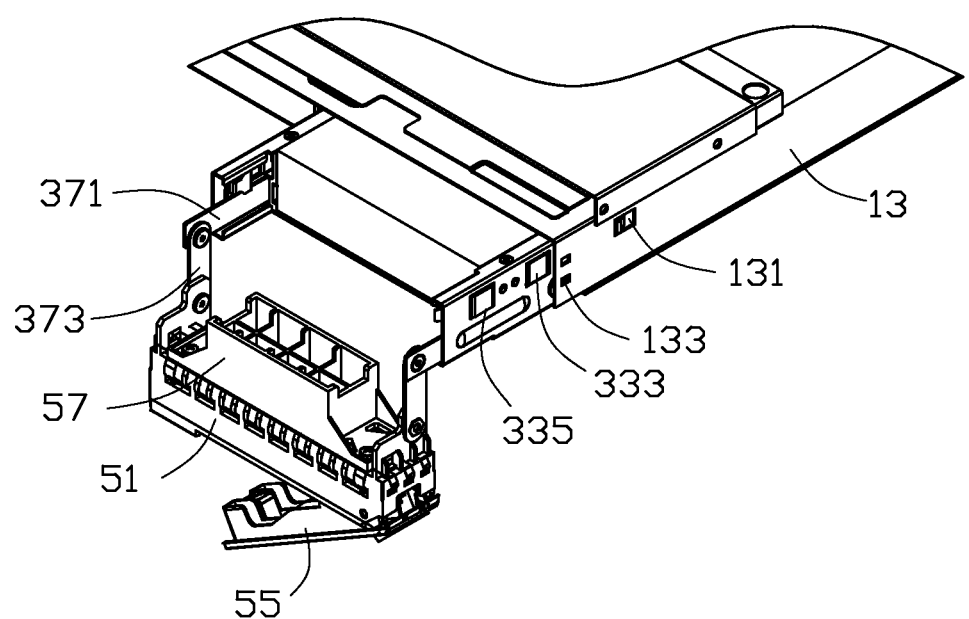
FIG. 7 is an assembled view of FIG. 1, showing the electronic device in a first state.
Figure 8:
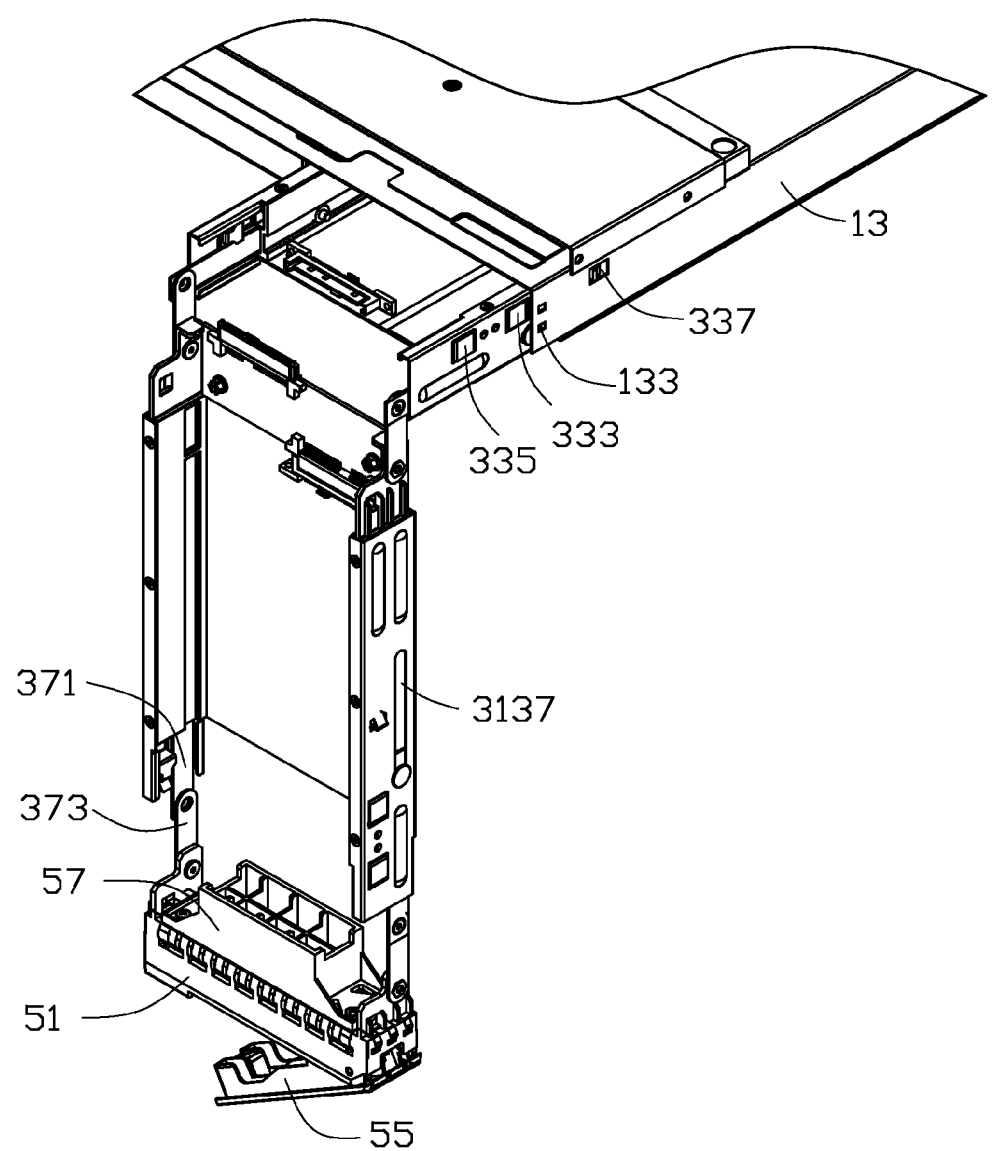
FIG. 8 is an assembled view of FIG. 1, showing the electronic device in a second state.

FIG. 7 and FIG. 8 illustrate that in disassembly, the latch 561 is unlocked from the cover 51 via operation of the latching member 56, and the operating portion 55 is rotated away from the cover 51. The protrusions 551 of the operating portion 55 are disengaged from the mounting holes 133 of the chassis 10. The mounting apparatus 20 is pulled forward until the hooks 3373 of the front supporting device 30 engage in the corresponding lock holes 131 of the side walls 13 and 15 by resilient force of the corresponding lock pieces 33. At this time, the first pressing portions 333 and the second pressing portions 335 of the front supporting device 30 are exposed out of the front end of the chassis 10. The second pressing portions 335 of the front supporting device 30 are pressed toward each other to deform front ends of the corresponding lock pieces 33 and disengage the hooks 3393 of the corresponding second clasp members 339 from the lock openings 593 of the cover 51. The bezel 50 is pulled forward, and the connecting members 37 of the front supporting device 30 are slid out along the corresponding slide slots 3137 until the rivets 375 of the connecting members 37 are stopped by front ends of the corresponding slide slots 3137. The bezel 50 and the second poles 373 of the front supporting device 30 are rotated down to be perpendicular to the front supporting device 30, so that the data storage device 300 in the front supporting device 30 can be taken out.

The first pressing portions 333 of the front supporting device 30 are pressed toward each other to deform rear ends of the corresponding lock pieces 33 and disengage the hooks 3373 of the corresponding first clasp members 337 from the lock holes 131 of the chassis 10. The front supporting device 30 is further pulled forward until the hooks 3373 of the clasp members 337 of the rear supporting device 30 engage in the lock holes 131 of the side walls 13 and 15 by resilient force of the corresponding lock pieces 33. The first pressing portions 333 and the second pressing portions 335 of the rear supporting device 30 are exposed out of the front end of the chassis 10. The second pressing portions 335 of the rear supporting device 30 are pressed toward each other to deform front ends of the corresponding lock pieces 33 and disengage the hooks 3393 of the corresponding second clasp members 339 from the lock openings 3581 of the front supporting device 30. The front supporting device 30 is pulled forward, and the connecting members 37 of the rear supporting device 30 are slid out along the corresponding slide slots 3137 until the rivets 375 of the connecting members 37 are stopped by front ends of the corresponding slide slots 3137. The second connector 75 is disconnected from the connector 303 of the data storage device 300 in the rear supporting device 30. The front supporting device 30 together with the second poles 373 of the second supporting device 30 are rotated down to be perpendicular to the rear supporting device 30, the data storage device 300 in the rear supporting device 30 can be taken out.

In other embodiments, the mounting apparatus 20 can comprise a plurality of supporting devices 30, and each supporting device 30 can comprises two lock plates 358 and two stop plates 359. In other embodiments, the lock openings 3581, the pivot holes 3583, and the stop plates 359 can be defined in the brackets 31 of each supporting device 30.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. An electronic device comprising:
   a chassis having two side walls, wherein a front end of the each side wall defines a lock hole;
   two data storage devices configured to be coupled to the chassis;
   two supporting devices coupled to each other and slidably received between the two side walls of the chassis, each of the two supporting devices comprising:
   a bracket to receive one of the data storage devices and comprising two opposite side plates;
   a pair of lock pieces respectively mounted to the side plates, wherein each lock piece comprises a first clasp member and a second clasp member opposite to the first clasp member, each side plate defines a lock opening, and the first clasp members are configured to extend through the lock openings and insert into the lock holes of the chassis; and
   a pair of connecting members, wherein each of the pair of connecting members comprises a first pole slidably coupled to the corresponding side plate and a second pole rotatably coupled to the first pole; and
   a bezel coupled to a front one of the supporting devices, wherein the second clasp members of the front supporting device are configured to be detachably coupled to the bezel, the second clasp members of a rear one of the supporting devices are configured to be detachably coupled to a rear end of the front supporting device, the second poles of the front supporting device are configured to be coupled to the bezel, and the second poles of the rear supporting device are configured to be coupled to the rear end of the front supporting device.

2. The electronic device of claim 1, wherein an operating portion is rotatably coupled to a front end of the bezel, two protrusions protrude out from one end of the operating portion, and one of the side walls defines two mounting holes to lock the protrusions.

3. The electronic device of claim 1, wherein each lock piece comprises a first pressing portion, a second pressing portion, and a mounting piece coupled between the first pressing portion and the second pressing portion, the mounting piece is configured to be mounted to the corresponding side plate, the first clasp member extends from an extremity of the first pressing portion, the second clasp member extends from an extremity of the second pressing portion, each side plate defines two lock slots to allow the first pressing portion and the second pressing portion to extend through.

4. The electronic device of claim 1, wherein each side plate defines a slide slot extending along a lengthwise direction of the side plate, a fastener passes through the slide slot and fastens to a rear end of the corresponding first pole.

5. The electronic device of claim 1, wherein two opposite end of the bezel respectively define a pivot hole to be pivotably coupled to a front end of the corresponding second pole of the front supporting device, and a lock opening to detachably lock the second clasp member of the front supporting device.

6. The electronic device of claim 1, wherein a positioning member is configured to be mounted to an inside of each side plate, the connecting member and the lock piece mounted to each side plate are located between the side plate and the corresponding positioning member.

7. The electronic device of claim 6, wherein a rear end of each positioning member of the front supporting device defines a pivot hole to be pivotably coupled to a front end of the corresponding second pole of the rear supporting device, and a lock opening to detachably lock the second clasp member of the rear supporting device.

8. The electronic device of claim 6, wherein an upper portion of a first side of the positioning member defines a groove along the lengthwise direction of the positioning member to receive the corresponding lock piece, a lower portion of the first side of the positioning member defines a groove along the lengthwise direction of the positioning member to receive the corresponding connecting member, a second side of each positioning member defines a positioning groove along a lengthwise direction of the positioning member, a plurality of posts protrude out from opposite sides of each data storage device, the posts are configured to be received in the corresponding positioning groove.

9. The electronic device of claim 6, wherein a stop plate extends inward from a rear end of each positioning member of the front supporting device, to engage with a front end of the data storage device mounted in the rear supporting device.

10. The electronic device of claim 1, wherein a circuit board is mounted to a rear end of the front supporting device, a first connector is mounted to a front end of the circuit board to be electrically coupled to the storage device mounted in the front supporting device, and a second connector is mounted to a rear end of the circuit board to be electrically coupled to the storage device mounted in the rear supporting device.

11. A mounting apparatus for a data storage device, comprising:
    a first supporting device comprising:
      a bracket configured for receiving the data storage device and comprising two opposite side plates;
      a pair of lock pieces respectively mounted to the side plates, wherein each lock piece comprises a first clasp member and a second clasp member opposite to the first clasp member, each side plate defines a lock opening, the first clasp members are configured to extend through the lock openings; and
      a pair of connecting members, wherein each of the pair of connecting members comprises a first pole slidably coupled to the corresponding side plate and a second pole rotatably coupled to the first pole; and
    a bezel coupled to the first supporting device, wherein the second clasp members of the first supporting device are configured to be detachably coupled to the bezel, and the second poles of the first supporting device are configured to be coupled to the bezel.

12. The mounting apparatus of claim 11, further comprising a second supporting device coupled to a rear end of the first supporting device, wherein the second supporting device comprises a bracket, a pair of lock pieces, and a pair of connecting members, the bracket of the second supporting device is configured for receiving another data storage device and comprises two opposite side plates, the lock pieces of the second supporting device are respectively mounted to the side plates of the second supporting device, each lock piece of the second supporting device comprises a first clasp member and a second clasp member opposite to the first clasp member, each side plate of the second supporting device defines a lock opening, the first clasp members of the second supporting device are configured to extend through the lock openings of the second supporting device, the second clasp members of the second supporting device are configured to be detachably coupled to a rear end of the first supporting device, each connecting member of the second supporting device comprises a first pole slidably coupled to the corresponding side plate, and a second pole rotatably coupled to the first pole of the second supporting device and coupled to the rear end of the first supporting device.

13. The mounting apparatus of claim 12, wherein each lock piece comprises a first pressing portion, a second pressing portion, and a mounting piece coupled between the first pressing portion and the second pressing portion, the mounting piece is configured to be mounted to the corresponding side plate, the first clasp member extends from an extremity of the first pressing portion, the second clasp member extends from an extremity of the second pressing portion, each side plate defines two lock slots to allow the first pressing portion and the second pressing portion to extend through.

14. The mounting apparatus of claim 12, wherein each side plate defines a slide slot extending along a lengthwise direction of the side plate, a fastener passes through the slide slot and fastens to a rear end of the corresponding first pole.

15. The mounting apparatus of claim 12, wherein two opposite end of the bezel respectively define a pivot hole to be pivotably coupled to a front end of the corresponding second pole of the first supporting device, and a lock opening to detachably lock the second clasp member of the first supporting device.

16. The mounting apparatus of claim 12, wherein a positioning member is configured to be mounted to an inside of each side plate, the connecting member and the lock piece mounted to each side plate are located between the side plate and the corresponding positioning member.

17. The mounting apparatus of claim 12, wherein a rear end of each positioning member of the first supporting device defines a pivot hole to be pivotably coupled to a front end of the corresponding second pole of the second supporting device, and a lock opening to detachably lock the second clasp member of the second supporting device.

18. The mounting apparatus of claim 12, wherein an upper portion of a first side of the positioning member defines a groove along the lengthwise direction of the positioning member to receive the corresponding lock piece, a lower portion of the first side of the positioning member defines a groove along the lengthwise direction of the positioning member to receive the corresponding connecting member, a second side of each positioning member defines a positioning groove along a lengthwise direction of the positioning member, a plurality of posts protrude out from opposite sides of each data storage device, the posts are configured to be received in the corresponding positioning groove.

19. The mounting apparatus of claim 12, wherein a circuit board is mounted to a rear end of the first supporting device, a first connector is mounted to a front end of the circuit board to be electrically coupled to the storage device mounted in the first supporting device, and a second connector is mounted to a rear end of the circuit board to be electrically coupled to the storage device mounted in the second supporting device.

20. A supporting device for a data storage device, the supporting device comprising:
 a bracket configured for receiving the data storage device and comprising two opposite side plates;
 a pair of lock pieces respectively mounted to the side plates, wherein each lock piece comprises a first clasp member and a second clasp member opposite to the first clasp member, each side plate defines a lock opening, the first clasp members are configured to extend through the lock openings; and
 a pair of connecting members wherein each of the pair of connecting members comprises a first pole slidably coupled to the corresponding side plate and a second pole rotatably coupled to the first pole.

* * * * *